(12) United States Patent
Rakutt et al.

(10) Patent No.: US 9,533,468 B2
(45) Date of Patent: Jan. 3, 2017

(54) STRUCTURAL ELEMENT AND METHOD FOR THE PRODUCTION THEREOF

(71) Applicant: Airex AG, Sins (CH)

(72) Inventors: Dietmar Rakutt, Cham (CH); Martin Gaul, Birrhard (CH)

(73) Assignee: Airex AG, Sins (CH)

( * ) Notice: Subject to any disclaimer, the term of this patent is extended or adjusted under 35 U.S.C. 154(b) by 0 days.

(21) Appl. No.: 14/388,275

(22) PCT Filed: Mar. 26, 2013

(86) PCT No.: PCT/EP2013/056374
§ 371 (c)(1),
(2) Date: Dec. 19, 2014

(87) PCT Pub. No.: WO2013/144130
PCT Pub. Date: Oct. 3, 2013

(65) Prior Publication Data
US 2015/0125686 A1   May 7, 2015

(30) Foreign Application Priority Data

Mar. 26, 2012 (DE) .......... 10 2012 102 603
Mar. 28, 2012 (DE) .......... 10 2012 102 689

(51) Int. Cl.
*B29C 44/56* (2006.01)
*B32B 5/32* (2006.01)
(Continued)

(52) U.S. Cl.
CPC . *B32B 5/32* (2013.01); *B26F 3/12* (2013.01); *B29C 44/56* (2013.01);
(Continued)

(58) Field of Classification Search
CPC .... Y10T 156/1075; B26F 3/12; B29C 66/727; B29C 44/5654; B29C 44/5681; B29C 65/1433; B32B 5/18; B32B 5/20; B32B 5/245; B32B 5/32; B32B 27/065; B32B 2266/08; B32B 2305/022; B32B 38/004; B29K 2067/003
(Continued)

(56) References Cited

U.S. PATENT DOCUMENTS 3,757,617 A * 9/1973 Fabbri .................... B26D 3/006
                                                 83/171
4,137,348 A   1/1979 Gilman
(Continued)

FOREIGN PATENT DOCUMENTS

CN    1822939      8/2006
CN    102143840    8/2011
(Continued)

OTHER PUBLICATIONS

International Search report Apln. No. 201380016659.X dated May 26, 2015.
(Continued)

*Primary Examiner* — Carson Gross
(74) *Attorney, Agent, or Firm* — Bachman & LaPointe, PC

(57) ABSTRACT

A structural element for use as a core layer in a sandwich composite element, wherein the structural element (2) is formed from a plurality of mutually welded body segments (4, 5) made from an extrusion foamed thermoplastic, and wherein the structural element (2) has a first face side (1) for bonding to a cover layer, wherein a surface of the first face side (1) that can be loaded with a resin (8) has open pores (6), wherein the surface of the first face side (1) is created by hot-element cutting, in such a manner that the surface is thermally sealed to some extent, wherein a gloss value of the (Continued)

surface of the first face side (1), measured at 60° in accordance with DIN 67530-1982 is between 2 and 10 gloss units.

8 Claims, 4 Drawing Sheets

(51) Int. Cl.
| | |
|---|---|
| B32B 5/02 | (2006.01) |
| B32B 5/18 | (2006.01) |
| B32B 5/24 | (2006.01) |
| B32B 5/28 | (2006.01) |
| B32B 17/04 | (2006.01) |
| B29C 65/02 | (2006.01) |
| B32B 3/18 | (2006.01) |
| B26F 3/12 | (2006.01) |
| B32B 5/20 | (2006.01) |
| B32B 27/06 | (2006.01) |
| B32B 27/36 | (2006.01) |
| B32B 37/15 | (2006.01) |
| B32B 38/00 | (2006.01) |
| B29C 65/00 | (2006.01) |
| B32B 37/12 | (2006.01) |
| B29C 65/74 | (2006.01) |
| B29C 65/82 | (2006.01) |
| B29K 67/00 | (2006.01) |
| B29K 105/04 | (2006.01) |

(52) U.S. Cl.
CPC ...... *B29C 44/5654* (2013.01); *B29C 44/5681* (2013.01); *B29C 65/02* (2013.01); *B29C 66/919* (2013.01); *B29C 66/91421* (2013.01); *B29C 66/91431* (2013.01); *B29C 66/934* (2013.01); *B29C 66/939* (2013.01); *B32B 3/18* (2013.01); *B32B 5/024* (2013.01); *B32B 5/18* (2013.01); *B32B 5/20* (2013.01); *B32B 5/245* (2013.01); *B32B 5/28* (2013.01); *B32B 17/04* (2013.01); *B32B 27/065* (2013.01); *B32B 27/36* (2013.01); *B32B 37/153* (2013.01); *B32B 38/0004* (2013.01); *B29C 65/743* (2013.01); *B29C 65/7433* (2013.01); *B29C 65/8215* (2013.01); *B29C 65/8223* (2013.01); *B29C 66/45* (2013.01); *B29C 66/727* (2013.01); *B29C 66/7212* (2013.01); *B29C 66/73921* (2013.01); *B29K 2067/003* (2013.01); *B29K 2105/046* (2013.01); *B29K 2995/0068* (2013.01); *B32B 37/1284* (2013.01); *B32B 2250/02* (2013.01); *B32B 2250/03* (2013.01); *B32B 2250/22* (2013.01); *B32B 2250/40* (2013.01); *B32B 2255/102* (2013.01); *B32B 2260/023* (2013.01); *B32B 2260/046* (2013.01); *B32B 2262/101* (2013.01); *B32B 2266/0264* (2013.01); *B32B 2266/08* (2013.01); *B32B 2305/022* (2013.01); *B32B 2307/538* (2013.01); *B32B 2307/54* (2013.01); *B32B 2307/718* (2013.01); *B32B 2307/72* (2013.01); *B32B 2419/06* (2013.01); *B32B 2603/00* (2013.01); *B32B 2605/08* (2013.01); *B32B 2605/10* (2013.01); *B32B 2605/12* (2013.01); *B32B 2607/00* (2013.01); *Y10T 428/249953* (2015.04); *Y10T 428/249976* (2015.04); *Y10T 428/249982* (2015.04)

(58) Field of Classification Search
USPC .......................................................... 156/78
See application file for complete search history.

(56) References Cited

U.S. PATENT DOCUMENTS

| 5,066,531 | A | 11/1991 | Legg et al. | |
|---|---|---|---|---|
| 5,834,082 | A | * 11/1998 | Day .................. | B29C 44/06 |
| | | | | 428/316.6 |
| 5,992,633 | A | 11/1999 | Burchard | |
| 6,213,540 | B1 | 4/2001 | Tusim et al. | |
| 7,501,175 | B2 | 3/2009 | Branch et al. | |
| 7,652,075 | B2 | 1/2010 | Lang et al. | |
| 7,988,805 | B2 | 8/2011 | Rakutt et al. | |
| 2005/0060895 | A1 | 3/2005 | Huarcaya-Pro | |
| 2011/0165363 | A1* | 7/2011 | Wolf ................... | B32B 3/12 |
| | | | | 428/47 |

FOREIGN PATENT DOCUMENTS

| DE | 21 36 573 | 2/1973 |
|---|---|---|
| DE | 4336293 | 4/1995 |
| DE | 60 2006 000 081 | 5/2008 |
| DE | 602006000081 | 5/2008 |
| EP | 0873827 | 10/1998 |
| EP | 1 393892 | 3/2004 |
| EP | 1536944 B2 | 6/2006 |
| EP | 1688237 | 8/2006 |
| EP | 1734193 | 12/2006 |
| EP | 2153982 | 2/2010 |
| GB | 843483 | 8/1960 |
| GB | 2474431 | 4/2011 |
| GB | 2474431 A | 4/2011 |
| WO | 91/03372 A1 | 3/1991 |
| WO | 2004007600 A1 | 1/2004 |
| WO | 2004/024434 | 3/2004 |
| WO | 2004024434 A1 | 3/2004 |
| WO | 2005047377 A1 | 5/2005 |

OTHER PUBLICATIONS

Extract from Thieme, Chemie, 10th edition, vol. 6. pp. 4505-4507, ISBN: 3-13-735110-3, 1999.
OIN 67530, Jan. 1982, pp. 1-6.
Technical article from the Journal for Surface Technology: Issue 6, 2012, pp. 64-66, "Gloss measurement—Gloss quality?".
Brochure from the firm Zehntner concerning gloss measurements.
Affidavit from Mr. Philippe Brosse, SIA INDUSTRIE, dated Apr. 21, 2015.
Opponent's email documentation concerning the ordering of ArmaForm PET AC 115 structural elements by SIA INDUSTRIE dated Mar. 15, 2011 to Mar. 28, 2011.
Opponent's order documentation in respect of the ordered ArmaForm PET AC 115 structural element dated Mar. 30, 2011.
Shipping order and consignment note dated Apr. 13, 2011.
Parameter list for thermal treatment of ArmaForm PET AC 115 structural elements.
Written declaration from Dr. Mika Meller concerning the production of the ArmaForm PET AC 115 structural elements dated Apr. 22, 2015.
Opponent's presentation documents concerning the resin absorption of ArmaForm PET AC 115 structural elements from Jan. 2012.
Gloss value measurement results of the Federal Institute for Material Research and Testing (BAM), on an ArmaForm PET AC 115 structural element delivered to SIA INDUSTRIE on Apr. 19, 2011.
Order form dated Mar. 24, 2010 and delivery note Aug. 31, 2010 for laminating machine KFK-EL-E 1500 from Meyer.
Information sheet for laminating machine KFK-EL-E 1500 from Meyer.
Screenshots, which document the production of the structural elements delivered to SIA INDUSTRIE.
Thieme, Rompp Lexikon, (1992) pp. 3512-3513.
Opposition against European patent No. 2 670 591 filed Mar. 26, 2013.

(56) References Cited

OTHER PUBLICATIONS

Response to the grounds of opposition dated Apr. 23, 2015.

* cited by examiner

[Dimensions in mm]

STRUCTURAL ELEMENT AND METHOD FOR THE PRODUCTION THEREOF

BACKGROUND OF THE INVENTION

The invention relates to a structural element for use as a core layer in a sandwich composite element, a sandwich composite element, particularly for producing wind blades for wind power installations and/or for uses in the maritime sector (particularly for the production of boat hulls and boat decks), in the rail-transport sector (train fronts, roofs, floors, wall elements of railway carriages), in mass transport by road (bus roofs, floors, fronts), for structural uses in the building sector (e.g. roofs) and also a method for producing a structural element of this type.

A generic structural element in described in EP 1 536 944 B2, which is suitable and intended for use as a core layer in a sandwich composite element for producing wind blades in wind power installations. The known structural element distinguishes itself by means of a plurality of body segments made from polyethylene terephthalate (PET) that are arranged next to one another in one plane and connected to one another, the body segments being welded at the abutting side faces thereof, forming flat weld seams which, in a plan view, interconnect on a face side of the structural element, the flat weld seams forming a low-pore or pore-free plastic intermediate layer made from fused plastic of the body segments in the form of a reticulated web structure, which acts in a reinforcing manner.

The known planiform structural element is obtained by dividing a foam block, comprising the multiplicity of mutually welded body segments, perpendicularly to the planar extent of the intersecting weld seams by sawing the same into a multiplicity of plate-shaped structural elements. The thus-obtained structural element is processed to form a sandwich composite element, in that the face sides formed by sawing from a foam block are each bonded to a cover layer (e.g. aluminium sheet) using adhesive resin or are directly laminated to a fibre-reinforced resin cover layer without a further adhesive layer. The known structural elements have proven themselves as core layers in such sandwich composite elements. However, there are efforts to reduce the resin absorption of the structural element, particularly in the case of equal adhesive force of the cover layer, in order to thus obtain a sandwich composite element with a lower overall thickness and thus, for the same volume, with a lower weight for the same mechanical loadability. In the case of the laminating process in particular, in which the laminating resin is sucked into the layer arrangement with the aid of a vacuum, a reduced resin absorption is particularly interesting, as the laminating resin has the tendency, because of the vacuum loading, to fill all reachable cavities, and thus makes up a comparatively large proportion of the total weight.

It is suggested in WO 2005/047377 A1, which is not concerned with PET foams, to design the foam to have finer pores as a solution for a similar problem. However, this ultimately leads to unsatisfactory adhesion or adhesive action between a structural element and a cover layer.

A further approach for a solution, according to which the foamed material is condensed by applying pressure and temperature, is described in WO 2004/007600 A1, which is likewise not concerned with PET foams. However, this leads to foams with comparatively high density and makes the production method uneconomical, owing to the additionally required work step.

US 2005/0060895 A1 is concerned with the production of surfboards from a plurality of foamed structural elements made from polystyrene, the structural elements being shaped and welded to one another in a common method step. It is known from the published document to use hot-wire cutting for shaping the mutually welded structural elements.

U.S. Pat. No. 6,213,540 A1 describes a method for producing energy absorption products, in which a foam block is run through using a net made up of hot wires, in order to thus generate the weld seams within the block, which strengthen the structure. This published document is also not concerned with reducing the resin absorption.

A method for producing a structural element for use as a core layer in a sandwich composite element is described in GB 2474431 A, plastic layers initially being extruded over one another, and the respectively lower layer being heated by means of an infra-red heater before the subsequent layer is extruded on, so that the layers integrally connect to one another. The layer arrangement is then divided by means of hot-wire cutting into large blocks, which are then in turn divided into plate-shaped structural elements by means of hot-wire cutting. The published document does not consider the problem of reducing the resin absorption of the structural element during the further processing thereof to form a sandwich composite element.

SUMMARY OF THE INVENTION

Starting from the previously mentioned prior art, the invention is based on the object of specifying a structural element suitable for sue as a core layer in a sandwich composite element, which is of such a type that the resin absorption is reduced, particularly in the case of at least approximately equal cover-layer adhesion to a cover layer that can be connected to the structural element. Preferably, this goal should be achieved without additional work steps and without a definitive increase in the density of the structural element.

Furthermore, the object consists in specifying a method for producing such a structural element and also a sandwich composite element having such a structural element as core layer.

This object is achieved with the features disclosed herein with regards to the structural element, the method and the sandwich composite element. Advantageous developments of the invention are specified in the sub-claims. All combinations of at least two features disclosed in the description, the claims and/or the figures fall within the scope of the invention.

To avoid repetitions, features disclosed according to the device should be considered disclosed and claimable according to the method. Likewise, features disclosed according to the method should be considered disclosed and claimable according to the device.

The invention has recognised that the surface quality of the first face side (and preferably also of a second face side parallel to the first face side), using which, the preferably plate-shaped structural element can be bonded or laminated to a cover layer to form a sandwich composite element, is critical for resin absorption, as the resin, particularly an adhesive or laminating resin, can penetrate into the structural element through the open pores of the foam, which is preferably otherwise overwhelmingly closed-celled, opened through the separating layer for separating out, i.e. separating off the structural element from a foam block, wherein, from a certain penetration depth and thus penetration quantity, the adhesive or laminating resin, particularly a polyester resin, vinyl ester resin, epoxy resin or phenolic resin no longer has a positive effect on the adhesive action, but rather only increases the weight of the structural element instead, which is disadvantageous for lightweight-building uses, in which a sandwich component formed using such a structural element should be used as a supporting structural component. The invention has furthermore recognised that a smooth, pore-free surface likewise disadvantageously affects the cover-layer adhesion, as the adhesive resin cannot be satisfactorily anchored in the structural element. To achieve the object, the invention therefore suggests creating the surface of the first face side of the structural element in such a manner that the same has open pores, which ensure the desired anchoring of the resin in the structural element, it being important however, that part of the surface is thermally sealed, i.e. closed, in order to reduce resin absorption. This effect is based on the fact that, owing to the partial thermal sealing of the surface, fewer pores are available for the penetration of resin than in the case of a structural element according to the prior art, in which the first face side was created by sawing. A surface which fulfils these features is to be produced according to the invention by hot-element cutting, particularly hot-wire cutting, preferably in that the structural element is separated off from a foam block by hot-element cutting, the hot-element cutting process being managed such that the surface is not completely sealed, but rather open pores remain, in order to enable an anchoring of the resin.

An indicator that the method has been conducted correctly for the hot-element cutting procedure or for a surface of the first and/or second face side of the structural element, which distinguishes itself by low resin absorption with good cover-layer adhesion at the same time, is the gloss value, which is explained in more detail in the following, of the surface of the first and if appropriate also the second face side, measured at 60° in accordance with DIN 67530-1982. This should be between 2 and 10 gloss units according to the invention.

Preferably, a polyester resin, vinyl ester resin, epoxy resin or phenolic resin is used for producing sandwich composite elements, preferably in an infusion process. The use of a hot-cutting element is disadvantageous at first glance, as the cutting procedure takes an order of magnitude longer than using a saw used in the prior art.

As previously mentioned, a gloss value of the surface of the first face side, preferably also the gloss values of the surface of a second face side parallel thereto, measured at 60° in accordance with DIN 67530-1982 is between 2 and 10 gloss units, preferably between 2 and 8 gloss units, even more preferably between 3 and 6 gloss units. 100 gloss units in this case correspond to a glass reference body (even, polished black glass plate). When measuring the gloss value, it is to be taken into account that the irradiation direction takes place parallel to the cutting direction during hot-element cutting. The use of the gloss value as parameter for describing the surface of the first and preferably also the second face side is based on the idea that a surface having too few pores and which is in particular completely sealed and has too low a resin absorption achieves too high a gloss value, which is then associated with a poor adhesion action and on the other hand, too porous a surface, as is obtained in the prior art by sawing, has too low a gloss value, which, although it is associated with good adhesion, is associated with too high a resin absorption.

The effort to obtain a surface-optimised structural element run counter to the efforts for the temporal optimisation of a hot-element cutting process, as the person skilled in the art usually maximises both the temperature and the feed rate for optimising a hot-element cutting process, whereas is it necessary to work with as low a hot-element temperature as possible to obtain a surface according to the invention with the specified gloss units, which then results in a larger resistance and consequently also a lower feed rate and as a result a comparatively slow hot-element cutting process, which leads to a desired surface quality, which is sealed sufficiently, but not to too high a degree, in order to reduce the resin absorption on the one hand and to ensure a (still) good adhesion at the same time.

The structural element according to the invention is distinguished by a lower resin absorption with good adhesion or bonding properties or strength in the composite with a cover layer fixed on the first face side. Preferably, the sandwich composite element comprising the structural element comprises not only one cover layer, but rather two parallel cover layers, which accommodate the structural element between them, each cover layer further preferably being stuck on a face side or laminated on in an infusion process, the surface of which is created by hot-element cutting in such a manner that the surface is thermally sealed to some extent, that is to say still has open pores. Preferably, the cover layers are glass-fibre-reinforced plastic, it furthermore being preferred that the resin penetrating the glass-fibre material is the resin producing the connection to the structural element at the same time.

The structural element is furthermore distinguished in that it takes on supporting functions in the sandwich composite element, for which reason it should in particular have a pressure resistance of at least 0.7 MPa, a pressure modulus of at least 30 MPa, a shear strength of at least 0.4 MPa and also a shear modulus of at least 10 MPa.

The structural element according to the invention is suitable in particular as a core layer in a sandwich composite component produced in the infusion process, in which the structural element is built up in the dry state with non-woven or woven fabric preferably arranged on both sides and is subsequently impregnated with liquid laminating resin from a storage container, the laminating resin being sucked into the layer structure with the aid of a vacuum. Preferably, the resin connecting the cover layers to the structural element is at the same time also the cover layer resin, with which the non-woven or woven fabric, particularly glass-fibre mats are impregnated.

It has proven particularly advantageous if an area proportion between approximately 35% and approximately 85%, preferably between approximately 40% and approximately 75% of the first and preferably also the second face side is thermally sealed.

It is particularly preferred, if the density of the structural element is chosen from a value range between 50 kg/m$^3$ and 250 kg/m$^3$, even more preferably between 60 kg/m$^3$ and 150 kg/m$^3$.

Very particularly preferably, the extrusion-foamed thermoplastic material is polyethylene terephthalate (PET). Particularly preferably, the average pore size (in regions outside weld seams) is between 0.1 mm and 1.0 mm, preferably between 0.2 mm and 0.8 mm. It is very particularly preferred, if the foam block, from which a structural element according to the invention can be separated, is produced in accordance with a method produced in EP 1 536 944 B2, wherein, instead of the saw used in EP 1 536 944 B2 to separate the structural element from the foam block, a hot-element cutting device, particularly a hot-wire cutting device, is to be used, in order to construct the surface of the first and preferably also a second parallel face side in accordance with the concept of the invention.

With regards to the method features for producing the foam block disclosed there and also with regards to the material parameters disclosed there, EP 1 536 944 B2 should be seen as disclosed as belonging to the invention in the context of a development and included in the application.

Very particularly preferably, the surface of the first face side is created such that the resin absorption on the first face side (or into the first face side) is less than 600 g/m² and/or is chosen between 100 g/m² and 600 g/m², preferably between 150 g/m² and 500 g/m². Resin absorption is the quantity (the weight) of resin, which is absorbed in the structural element per area section of the first face side through the open pores. One option for determining resin absorption is described in the following:

Resin absorption takes place by determining the density of the structural element before and after infusion with a resin. To make an impregnated resin more visible, the same is preferably coloured. The following resin composition is preferably used as resin for carrying out the measurement, the resin constituents being products from the company Walter Mader AG, 8956 Killwangen. The product numbers are given in brackets:

100 parts Crystic 192 LV polyester resin (prod. no. 900.0.0.0007), 2 parts M60 curing agent (prod. no. 891.2.0.0002), 1 part 0.4% CO accelerating agent (prod. no. 892.0.0.0001), 1.5 parts Crystic Pigment Paste Orange (prod. no. 910.0.4.3290), and 0.04 parts BBK 10% inhibitor (prod. no. 895.0.0010).

The specimen cut out of a larger structural element preferably has the following dimensions: Length 200 mm, width 200 mm, thickness 20 mm, wherein three samples are to be tested for each structural element and the average value is to be calculated.

The gross density Rd1 in kg/m³ for each individual specimen is to be determined by precise weighing and volume determination by measuring using a Vernier calliper.

The structure described in FIG. 9 is used for the resin infusion. The following materials are layered on top of one another on a glass plate 17 from bottom to top:

Unifilo 450 g/m² continuous filament mat made from glass fibres 18, Bolleter+Co. AG, 9320 Arbon Release Ply F polyester peel fabric, blue 19, SuterKunststoffe AG, 3312 Fraubrunnen specimen layer with bevelled strips at the edge and strips between the specimens made from XPVC C70.55 foam 20

Release Ply F polyester peel fabric (blue) 19

Unifilo 450 g/m² continuous filament mat made from glass fibres 18

VAP film 21, Aero Consultants Ltd, 8606 Nanikon

An arrangement of 4×3 specimens according to FIG. 10 has proven useful for the specimen layer. The specimens of the structural elements to be investigated are to be distributed randomly.

The structure is sealed using a vacuum sealant tape 22 (AT 200 Y, yellow, Aero Consultants, 8606 Nanikon, Switzerland).

A 9 mm spiral strip, 23, from Otto Fischer AG, 2008 Zurich is inserted in the region of the inlet and outlet in each case and connected in the centre to a Normaplast T hose connector TS10 from Tecalto AG, 8048 Zurich.

PE hoses of sufficient length, naturally coloured, from Maagtechnik AG, 8600 Dübendorf, are attached to the two hose connectors. Before the actual infusion process, evacuation is carried out for 1 hour, in that the hose is clamped shut on the inlet side 24 and a vacuum is applied at the outlet side 25.

After checking for tightness, the resin is sucked out of a storage vessel, which contains 3 kg of the resin mixture, via the opened hose on the inlet side 8. After a few minutes, the resin should then move evenly and as rectilinearly as possible from the inlet to the outlet. Air bubbles must not be formed and the inlet is to be clamped off before air is sucked via the inlet 8.

Then, whether gelling starts by means of apparent thickening is to be checked at regular intervals in the resin still remaining in the vessel. From this point in time, the entire structure is kept under vacuum for a further hour.

Thereupon, the VAP film is removed and the Release ply F film is slowly peeled off on both sides of the specimen, wherein it must be ensured that as little resin as possible remains adhered to the peel-off film.

The resin on the specimens is fully cured overnight. After curing, the individual specimens are trimmed to an edge length of 185 to 190 mm on a saw, in order to eliminate edge influences.

Analogously, before the experiment, the gross density $Rd2$ in kg/m³ is to be determined by precise weighing and measuring by means of a Vernier calliper. The thickness of the specimen is also to be determined after the resin absorption.

The calculation of the resin quantity absorbed per m² of sample side is then calculated as follows:

$$\text{Resin absorption } [\text{g/m}^2] = 0.5 \times (Rd2 - Rd1)[\text{kg/m}^3] \times \text{thickness after resin absorption [mm]}$$

The factor 0.5 mirrors the reference to the first face side exclusively and is necessary insofar as resin penetrates not only into the first, but also into the second face side. The influence of the second face side is eliminated by means of the factor 0.5.

The average value is to be formed from the three determinations per structural element.

In a development of the invention, it is provided that the resin absorption of the previously mentioned second face side, parallel to the first face side, likewise has the previously mentioned resin absorption values.

In a development of the invention, it is advantageously provided that the specific peeling energy when peeling off the cover layer from the core layer of a specimen from a sandwich composite element is at least 100 J/m², preferably more than 200 J/m². The specific peeling energy is preferably determined as follows:

A 20 mm thick foam core layer (structural element) is laminated on both sides using a glass-fibre-reinforced resin to form a sandwich composite plate. Standard structure of the glass-fibre layers:

300 g/m² CSM
600 g/m² GF woven fabric
450 g/m² CSM
Core
450 g/m² CSM
600 g/m² GF woven fabric
300 g/m² CSM The resin used in the end use is used as resin. A polyester resin set up for a pot life of 40 min, preferably Crystic 196 MV from Walter Mader AG, 8956 Killwangen, Switzerland, can be used as standard.

Samples are sawn off from the sandwich composite plate according to FIG. 11. In each case, 3 samples in which the upper cover layer is peeled off and 3 samples in which the lower cover layer is peeled off. In order to be able to peel off the cover layer, a 25 mm long portion of the cover layer to be measured is exposed using two saw cuts perpendicular and parallel to the cover layer and provided with a bore.

The lower half of the sample is fixed in a clamping device 26 on a tensile test machine according to FIG. 12. The remaining, perforated part of the cover layer 27 to be measured is fastened on the load cell by means of hook 28 and chain 29.

A tear is created in the boundary layer between foam and upper cover layer and propagated to a length of approx. 100 mm using a test speed of 100 mm/min. Subsequently, the cross member is returned to the start position. In this case, the force is recorded as a function of the cross member path and one obtains a measurement curve analogous to FIG. 13.

The peeling energy is determined from the area 32 enclosed by the loading curve 30 and relief curve 31. This is divided by the tear area (sample width×tear length), in order to obtain the desired specific peeling energy. To determine the tear length, the end of the tear is marked under a microscope. The average value is formed from the results of the 6 samples in total.

Very particularly preferred is an embodiment of the structural element, in which, as mentioned at the beginning, in addition to the first face side produced by hot-element cutting, the same has a second face side arranged parallel thereto, which is produced analogously to the first face side. Preferably, the values for resin absorption and/or the gloss value and/or the peeling strength lie in the ranges specified according to a development in connection with the first face side.

Preferably, the thickness tolerance of the structural element is, i.e. the maximum thickness tolerance is, less than 1.0 mm, preferably less than 0.5 mm, measured between the first and the second face side of a plane-parallel plate with 2 to 3 m$^2$ base area.

There are different possibilities with regards to the structural design of the structural element. According to a first preferred embodiment, the structural element has parallel flat weld seams exclusively in a plan view onto the first or second face side, the planar extent of which preferably extends perpendicularly to the planar extent of the first face side. The parallel weld seams then act in a reinforcing manner with respect to pressure loading of the first face side. A structural element of this type differs from the structural element disclosed in EP 1 536 944 B2 not only with regards to the surface quality of the first face side, but also with regards to the arrangement of the weld seams. According to an alternative preferred embodiment, the weld seams are constructed and arranged as described and claimed in EP 1 536 944 B2, i.e. a network made up of intersecting weld seams, which form a web structure that acts in a reinforcing manner, is formed (in a plan view onto the first face side). What is meant in each case is the arrangement of the weld seams in a plan view onto the first face side.

It is particularly expedient for the use of the structural element as a supporting component, if the foamed plastic has an overwhelmingly closed-celled structure, the closed cells being provided in a volume-per-cent ratio with respect to the structural element volume from a value range between 92 and 98% by volume. The percentage is determined by subtracting the proportion of open cells from 100%. This value is determined or defined by means of water absorption in a vacuum in accordance with ASTM D 1056-07, the percentage-by-weight value resulting fro the method described in the standard having to be converted in advance to the percentage-by-volume value, in that the percentage-by-weight value is multiplied by the density of the structural element and has to be divided by the density of water.

In order to achieve a high compressive rigidity of the structural element perpendicularly to the planar extent thereof or perpendicularly to the first face side, it is advantageously provided in a development of the invention that the first face side is arranged perpendicularly to the extrusion direction of the body segments, i.e. perpendicularly to the full extent of the polymer structure, which is orientated in the extrusion direction. Preferably, the first face side is additionally or alternatively arranged perpendicularly to the planar extent of weld seams provided between the body segments, so that a weld-line structure results in the plan view onto the first face side.

The invention also relates to a method for producing a previously described structural element constructed according to the concept of the invention, wherein according to the method, preferably plate- or rod-shaped body segments are produced initially by extrusion foaming from a thermoplastic, PET in particular. These are then longitudinally welded together planarly, particularly gaplessly, i.e. without free space, to form a foam block, the extrusion direction preferably extending in the direction of the longitudinal extent of the body segments. Thereupon, the foam block is divided into individual structural elements, preferably transversely to the planar extent of the flat weld seams formed between the body segments, the first face side and preferably also a second face side, parallel thereto, being created thereby on the structural elements with a surface having open pores. Preferably, the structural element produced from the method consists exclusively of plastic, i.e. it is free of adhesive in particular.

According to the invention, the division of the foam block into the structural elements takes place not by means of a saw, but rather by hot-element welding, particularly hot-wire welding, specifically in such a manner that the surface of the first face side and preferably also the second face side is sealed to some extent (with retention of pores).

The temperature of the hot element, particularly of the hot wire, has proven critical for carrying out the method, particularly in combination with the relative speed of the hot element in relation to the foam block. Good results were achieved with regards to the desired surface quality using a temperature of the hot element from a value range between 300° C. and 700° C., particularly between 400° C. and 700° C., preferably between 500° C. and 700° C., wherein this temperature should be provided at least at the start of a cutting or separation process. Preferably, the temperature is maintained at least approximately during the cutting or separation process also.

In addition, in combination with the above-shown temperature, for separation, a relative speed between hot element and foam block by moving the hot element and/or the foam block be chosen from a value range between 50 mm/min and 150 mm/min is additionally important.

Previously mentioned temperature and feed rate values apply in particular for a foam block material with a thickness (including entrapped air) from a range between 50 kg/m$^3$ and 250 kg/m$^3$, preferably between 60 kg/m$^3$ and 150 kg/m$^3$.

It was found that the optimum feed rate for achieving the desired gloss values is dependent on the density of the foam block to be processed. For a foam block with a density of 60 kg/m$^3$, the feed rate of the hot element is preferably chosen from a value range between 100 mm/min and 140 mm/min. For a foam block with a density of 100 kg/m$^3$, the feed rate is preferably chosen from a value range between 65 mm/min and 85 mm/min. For a foam block with a density of 130 kg/m³, the feed rate is preferably chosen from a value range between 50 mm/min and 70 mm/min.

This is in turn connected with the fact that the required sealing energy per area to be sealed in part by means of the hot element is dependent on the density of the foam block.

In this case, it was found that the following functional relationship applies for calculating the energy:

$$E = \frac{1}{2} \times (U \times I)/(v \times L)$$

In this case, E represents the energy to be introduced per area to be sealed in part. The electrical energy used is calculated from the product of the electric voltage U applied to the hot element and the current intensity I of the current flowing through the hot element. This product is divided by the product of the feed rate v of the hot element, particularly of the hot wire and the length L of the hot element, measured perpendicularly to the feed direction. The unit of energy is Wh/m², where W represents watts, h represents hours and m² represents square meters. The factor ½ takes into account the fact that for each hot element, two part-sealed surfaces are created at the same time.

Preferably, in this case, the width of the foam block, measured parallel to the longitudinal extent of the hot element corresponds to at least 60%, preferably between 70% and 95% of the length of the hot element.

Optimum gloss values of the resulting surface of the corresponding face side are achieved, if an energy per area to be sealed in part is introduced via the hot element, particularly the hot wire, which energy is calculated according to the following functional, linear relationship:

$$E\,[Wh/m^2] = m\,[Whm/kg] \times \text{foam block density}\,[kg/m^3] + b\,[Wh/m^2]$$

In this case, m is preferably chosen from a value range between +0.12 and +0.20 Whm/kg, even more preferably from a value range between +0.12 and +0.18 Whm/kg. At the same time, b is preferably chosen from a value range between −0.5 and +0.5 Wh/m², very particularly preferably between −0.5 and 0.0 Wh/m².

For a density of 60 kg/m³, the following preferred limits therefore result for the energy (sealing energy) preferably introduced per area: 6.7 Wh/m² to 12.5 Wh/m², particularly 6.7 Wh/m² to 10.8 Wh/m². For a density of the foam block of 100 kg/m³, preferred energy ranges result between 11.5 Wh/m² and 20.5 Wh/m², preferably between 11.5 Wh/m² and 18.0 Wh/m². For a foam material with a density of 130 kg/m³, the following preferred limits for the energy introduced result between 15.1 Wh/m² and 26.5 Wh/m², preferably between 15.1 Wh/m² and 23.4 Wh/m².

On the basis of the following table, it can be seen that if the preferred cutting-speed and cutting-temperature specification (see column on right) are not complied with, a surface results, the gloss values of which lie outside the claimed range. The peeling strength in the case of poor settings could not be measured, as the adhesion ranged from minimal to not present.

|  |  | Reference sawn | Good setting | Poor setting |
| --- | --- | --- | --- | --- |
| Foam density | kg/m³ | 105 | 105 | 105 |
| Wire thickness | mm |  | 0.4 | 0.4 |
| Wire feed | mm/min |  | 84 | 96 |
| Wire voltage | V |  | 54 | 48 |
| Current consumption | A |  | 3.45 | 3 |
| Wire length | m |  | 1.49 | 1.49 |

-continued

|  |  | Reference sawn | Good setting | Poor setting |
| --- | --- | --- | --- | --- |
| Number of areas sealed in part |  |  | 2 | 2 |
| Specific energy per area sealed in part | Wh/m² |  | 12.40 | 8.39 |
| Gloss value 60° |  | 1.7 | 4.3 | 28.6 |
| Resin absorption | g/m² | 1070 | 320 | 130 |
| Peeling strength | J/m² | 748 | 641 | Not measurable |
| Thickness tolerance | mm |  | 0.4 | 5.9 |

Preferably, the foam block is cut into a multiplicity of structural elements using a plurality of parallel hot elements, particularly hot wires at the same time. Preferably, more than 30, even more preferably more than 40, in particular between 40 and 100 hot elements, particularly hot wires, are used in the process.

It is particularly expedient if the welding together of the body segments takes place by means of planar fusing, for example by means of a heated blade, of the side faces of the body segments to be connected and subsequent joining together of the same, the melt zones curing forming the planar weld seams in the form of low-pore or pore-free intermediate plastic layers, which preferably takes place without further additives such as adhesive resins, so that the structural element as such consists of plastic exclusively, specifically of the thermoplastic, particularly PET.

According to the invention, the temperature of the hot element(s) is set in such a manner and at the same time the relative speed between hot element or elements and foam block is chosen in such a manner that the previously mentioned gloss value from a value range between 2 and 10 is achieved.

It has been established to be very particularly preferred if the diameter of the, preferably cylindrical hot wire is chosen from a diameter value range between 0.25 mm and 2.0 mm, particularly between 0.25 mm and 1.00 mm, preferably between 0.40 mm and 0.80 mm.

The invention also presents a sandwich composite element, particularly for producing wind blades for wind power installations and/or for use in the maritime sector (particularly for the production of boat hulls and boat decks), in the rail-transport sector (particularly for the production of train fronts, roofs, floors, wall elements of railway carriages), in mass transport by road (particularly for the production of bus roofs, floors, fronts), for structural uses in the building sector (e.g. roofs) inter alia, in addition to the structural element according to the invention, the sandwich composite element comprising at least one cover layer connected to the structural element, particularly two cover layers accommodating the structural element between them, it being preferred that the at least one cover layer is constructed from glass-fibre-reinforced plastic.

The invention is preferably suited to the production of sandwich composite elements in the resin infusion process. In this case, the fibre composite (non-woven fabric or woven fabric) incl. core material is built up in the dry state. Subsequently, the same is covered by means of vacuum-tight film and sealed at the edge. A vacuum applied on the film finally pulls the liquid resin out of a storage container through the structure and thus impregnates the composite. The curing or the resin reaction typically takes place at room temperature, but can also take place at elevated temperature.

The invention therefore also relates to a sandwich composite element, which was produced in the resin infusion process, it being important that the resin, actually the laminating resin is sucked into the layer structure by means of a vacuum, it being particularly preferred if the resin connecting the cover layers to the structural element is at the same time the resin of the cover layers, with which the non-woven fabric or woven fabric of the cover layers is impregnated.

It is very particularly preferred if the body segments have a shape cross section, which allows a gapless joining together of the body segments, the body segments preferably being gaplessly joined together by welding.

BRIEF DESCRIPTION OF THE DRAWINGS

Further advantages, features and details of the invention result from the following description of preferred exemplary embodiments, as well as on the basis of the drawings. In the figures.

In the figures, the same elements and elements with the same function are labelled with the same reference numbers.

DETAILED DESCRIPTION

Figure 1:
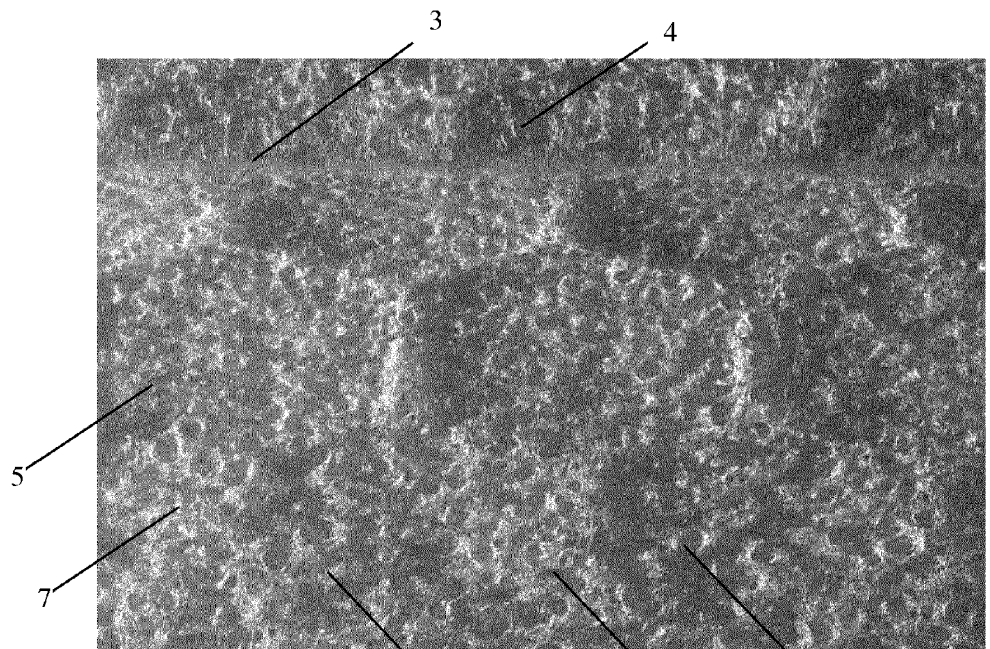
FIG. 1: shows a plan view onto a first face side of a structural element.

A first face side 1, more precisely the surface of a first face side 1 of a structural element 2 made from foamed PET, is shown in FIG. 1 in a plan view. A weld seam 3 can be seen, the planar extent of which runs perpendicularly to the planar extent of the first face side 1 and planarly connects the two body segments 4, 5, which were obtained by the extrusion foaming of PET, to one another. It can be seen that the body segments 4, 5 themselves have a type of honeycomb structure, which results from the fact that the PET is pressed through a hole-type nozzle at the end of the extruder and the individual strands are automatically welded to one another over the entire area, i.e. gaplessly.

The surface of the first face side 1 of the structural element 2 has a gloss value of 4.3.

A multiplicity of open pores 6, which were created by separating the structural element 2 from a foam block by means of a hot wire, can be seen. The surface of the first face side 1 is thermally sealed in regions 7 between the pores 6.

Figure 2:
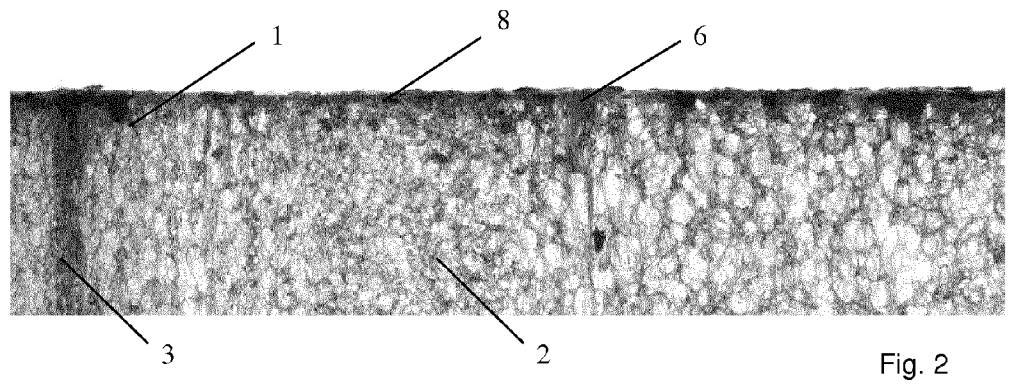
FIG. 2: shows a sectional view through a structural element perpendicularly to the planar extent of the first face side, after the same was loaded with adhesive resin to determine the resin absorption in accordance with the method described in the general part of the description.

A sectional view is shown in FIG. 2 perpendicularly to the planar extent of the first face side 1 through a structural element 2. A second face side, which is cut off in the illustration according to FIG. 2 however, runs parallel to the first face side 1. Also to be seen here is a weld seam 3, which is to be seen at a low-pore (sealed) region.

Figure 3:
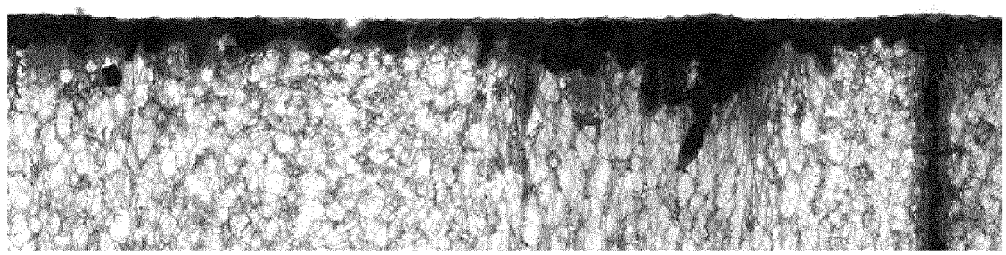
FIG. 3: shows a sectional view through a structural element according to the prior art by means of a face side produced by sawing, which was loaded with resin for determining the resin absorption.

The first face side 1 is loaded with adhesive resin 8 (for determining the resin absorption) in accordance with the method mentioned in the general part of the description. A certain penetration depth of the adhesive resin 8, a polyester resin, into the pore structure through the open pores 6 is to be seen. The resin absorption is 150 g/m$^2$. Compared to FIG. 3, in which a corresponding sectional view through a structural element according to the prior art with a first face side produced by sawing is shown, the penetration depth of the resin in the exemplary embodiment according to FIG. 2 is lower, and in particular, the adhesive resin 8 in the exemplary embodiment according to FIG. 2 can penetrate through substantially fewer available open pores into the first face side 1 than in the exemplary embodiment according to the prior art in FIG. 3, which overall leads to a considerably lower resin absorption of the exemplary embodiment according to FIG. 2, with the result of a lower overall weight of a sandwich element produced using the structural element 2 according to FIG. 2.

Figure 4:
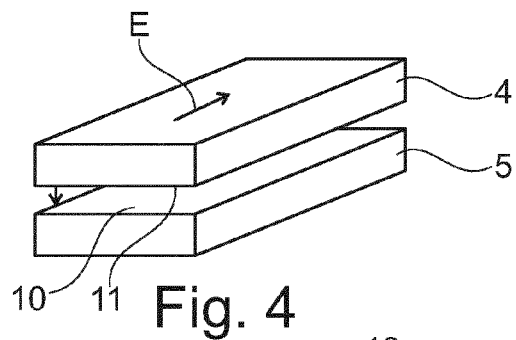
FIG. 4: shows two body segments, which are welded to one another along the longitudinal side face thereof.

A method step in the production of a structural element is shown in FIG. 4. Two plate-shaped body segments 4, 5 extruded in an extrusion direction E can be seen, which by way of example approximately have a thickness extent of 5 cm, a width extent of approximately 1 m and a longitudinal extent of approximately 2 m. The specimen segments 4, 5 are joined in the arrow direction 9 after the mutually opposite side faces 10, 11 were fused. This procedure is carried out with a plurality of body segments, so that a foam block 12 shown by way of example in FIG. 5 results. The foam block 12 according to FIG. 5 consists of a total of four specimen segments and has three parallel weld seams 3. The foam block 12 is divided into plate-shaped structural elements 2, as are shown in FIGS. 7 and 8, using a hot element 13, which is merely illustrated by way of example as a hot wire.

In this case, the separation or cutting direction 14 is preferably perpendicular to the extrusion direction E, perpendicular to the planar extent of the weld seams 3. The temperature of the hot element 13 is 640° C. in the exemplary embodiment shown and the speed with which the hot element 13 is moved through the foam block 12 is 84 mm/min, so that a face side 1 with the desired surface, having open pores and thermally sealed regions to some extent, results. On the side facing away from the first face side 1, the structural element has a second face side 15 parallel to the first face side 1, which was likewise produced by hot-element cutting. Preferably, the foam block 12 is separated into a plurality of structural elements at the same time using a multiplicity of parallel hot elements 13.

Figure 5:
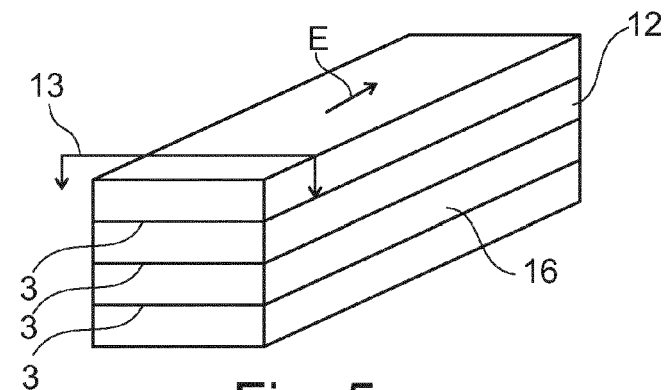
FIG. 5: shows a foam block made up of a plurality of mutually welded body segments, the foam block being divided by means of a hot wire perpendicularly to the planar extent of the weld seams in the structural elements.
Figure 6:
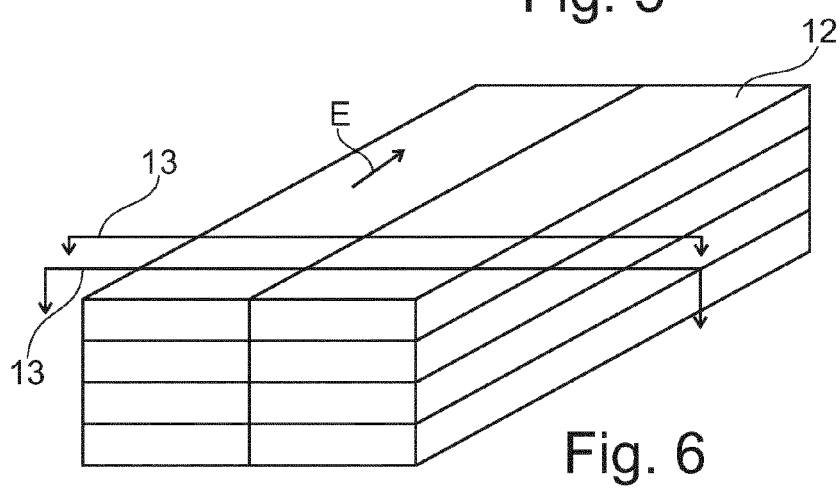
FIG. 6: shows an alternative foam block, produced from two or alternatively a plurality of foam blocks according to FIG. 5, which are welded to one another in such a manner that intersecting weld seams result, the foam block being divided into structural elements with the aid of hot wires.

In FIG. 6, two foam blocks 12 according to FIG. 5 are joined together by welding to form a joined foam block 12, specifically by welding the high sides 16 of the cuboidal structural element, which are orientated perpendicularly to the side faces and perpendicularly to the face side, so that the foam block has intersecting weld seams in a plan view onto the first face side, a plurality of parallel weld seams being provided, which are cut by at least one weld seam orientated perpendicularly thereto. In practice, it can happen that the parallel weld seams of the mutually welded foam blocks are not ideally flush with one another, but rather are arranged offset to one another in a stepped manner. This offset is even desired for increasing the stability. If a foam block 12 according to FIG. 6 is then divided into structural elements 2 analogously to the foam block 12 according to FIG. 5 with the aid of hot elements 13, structural elements 2 as shown in FIG. 8 result, it being possible to see intersecting weld seams on the first face side 1, the planar extent of which runs in the extrusion direction E, i.e. perpendicularly to the planar extent of the first face side 1 and the second face side 15 parallel thereto.

Figure 7:
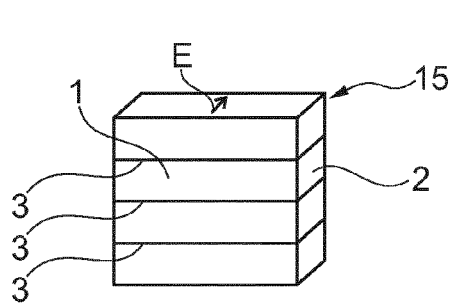
FIG. 7: shows a structural element resulting from a foam block according to FIG. 5, FIG. 8: shows a structural element resulting from the foam block according to FIG. 6, FIG. 9: shows the layer structure for measuring the resin absorption
Figure 8:
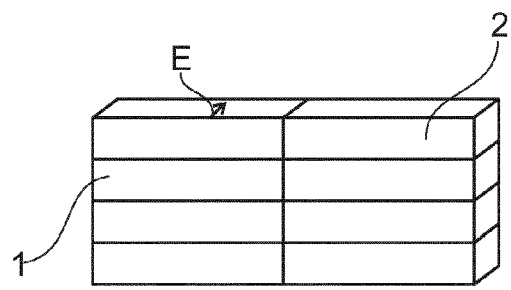
Figure 9:
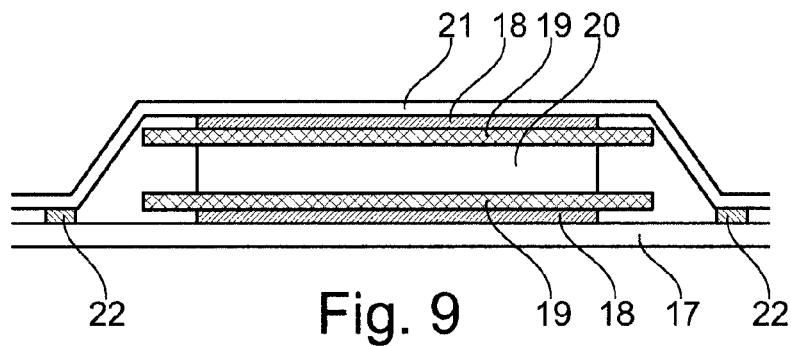
Figure 10:
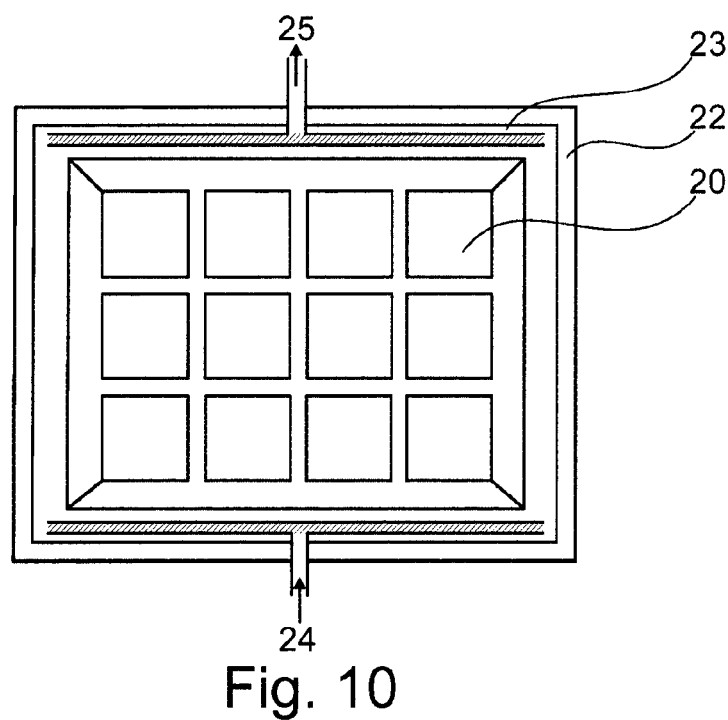
FIG. 10: shows the arrangement of the specimens for measuring the resin absorption
Figure 11:
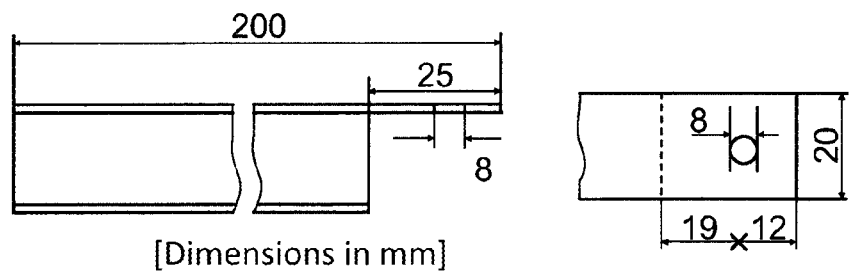
FIG. 11: shows a sample sawn out of a sandwich composite plate for measuring the specific peeling energy.
Figure 12:
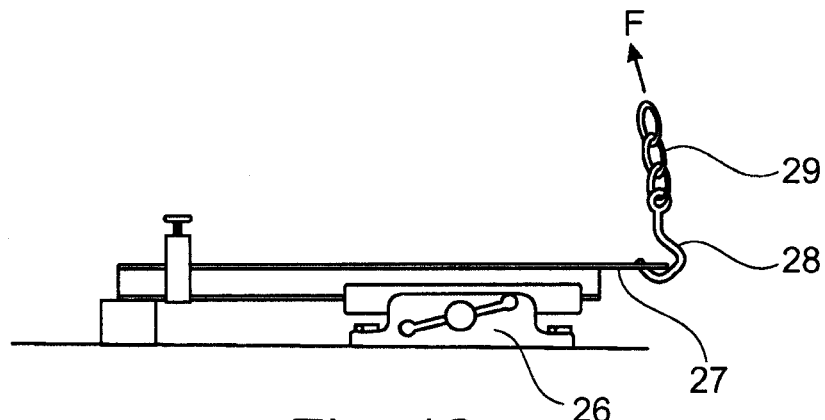
FIG. 12: shows an experimental set-up for determining the peeling energy, the sample according to FIG. 9 being fixed in a clamping device on a tensile test machine.
Figure 13:
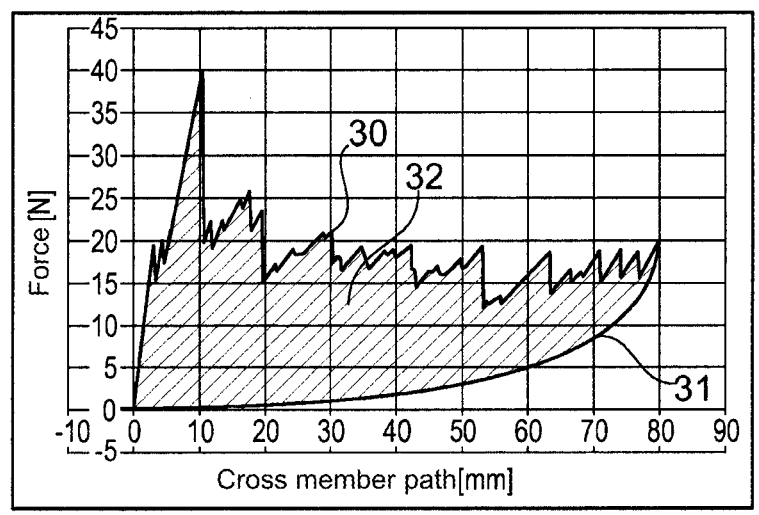
FIG. 13: shows a measurement curve recorded by means of a tensile test machine for determining the peeling energy, for which the tensile force is recorded as a function of the transverse path.

A sandwich composite element can be produced, in that a cover layer, particularly made from glass-fibre-reinforced plastic, is stuck onto the first and the face side 1, 15 of a structural element 2 shown by way of example in FIG. 7 or 8, preferably by means of a resin.

The invention claimed is:

1. A method for producing a structural element, comprising the steps of:
    producing plate- or rod-shaped body segments (4, 5) by the extrusion foaming of thermoplastic
    longitudinal, planar welding together of the body segments (4, 5) to form a foam block (12),
    dividing the foam block (12) into individual structural elements (2), transversely to the planar extent of flat weld seams (3) formed between the body segments (4, 5) and in the process, in each case creating a first face side (1) on the structural elements (2) with a surface having open pores, wherein the division of the foam block (12) into the structural elements (2) is carried out by hot-element cutting,
    wherein the temperature of the hot element, at least at the start of a cutting procedure, is set from a value range between 300° C. and 700° C., and wherein a relative speed from a range between 50 mm/min and 150 mm/min is generated between the hot element (13) and the foam block (12) during the division and as a result, the surface of the first face side (1) is thermally sealed to an extent sufficient to produce a gloss value of the surface of the first face side (1) measured at an angle of 60° in accordance with DIN 67530-1982 of between 2 and 10 gloss units.

2. The method according to claim 1, wherein the welding together is carried out by planar fusing of side faces (10, 11) of the body segments (4, 5) to be connected and subsequent joining together of the same and curing melt zones with the formation of flat weld seams (3) in the form of low-pore or pore-free plastic intermediate layers.

3. The method according to claim 1, wherein the temperature of the hot element, is set from a value range between 400° C. and 700° C., at least at the start of a cutting procedure.

4. The method according to claim 1, wherein an energy per area to be sealed in part is introduced by means of the hot element, which is calculated according to the following linear functional relationship:

$$E\ [Wh/m^2] = m\ [Whm/kg] \times \text{density of the foam block } [kg/m^3] + b\ [Wh/m^2],$$

wherein m is chosen from a value range between 0.12 and 0.20, and b is chosen from a value range between −0.5 and +0.5.

5. The method according to claim 1, wherein a hot wire with a diameter from a diameter value range between 0.25 mm and 2.0 mm is used as hot element (13).

6. The method according to claim 4, wherein m is chosen from a value between 0.12 and 0.18 and b is chosen from a value between −0.5 and 0.0.

7. The method according to claim 5, wherein the diameter value range is between 0.25 mm and 1.00 mm.

8. The method according to claim 5, wherein the diameter value range is between 0.40 mm and 0.80 mm.

* * * * *